United States Patent [19]

Ishii

[11] Patent Number: 4,519,255

[45] Date of Patent: May 28, 1985

[54] PRESSURE TRANSDUCER

[75] Inventor: Akira Ishii, Tokyo, Japan

[73] Assignee: Tokyo Shibaura Denki Kabushiki Kaisha, Kawasaki, Japan

[21] Appl. No.: 482,446

[22] Filed: Apr. 6, 1983

[30] Foreign Application Priority Data

Apr. 16, 1982 [JP] Japan .................................. 57-62492

[51] Int. Cl.³ .............................................. G01L 9/06
[52] U.S. Cl. .......................................... 73/727; 338/4
[58] Field of Search .................. 73/DIG. 4, 721, 727, 73/706, 754; 338/4, 42

[56] References Cited

U.S. PATENT DOCUMENTS

| | | | |
|---|---|---|---|
| 4,051,451 | 9/1977 | Kurtz et al. | 338/4 |
| 4,080,830 | 3/1978 | Eckstein et al. | |
| 4,127,840 | 11/1978 | House | 338/4 |
| 4,135,408 | 1/1979 | Di Giovanni | 73/721 |

FOREIGN PATENT DOCUMENTS

| | | |
|---|---|---|
| 1206952 | 9/1970 | United Kingdom . |
| 1521876 | 8/1978 | United Kingdom . |
| 1548589 | 7/1979 | United Kingdom . |

*Primary Examiner*—Donald O. Woodiel
*Attorney, Agent, or Firm*—Oblon, Fisher, Spivak, McClelland & Maier

[57] ABSTRACT

A pressure transducer includes a restricting member having a curved surface portion. The curved surface portion is so defined as to have a shape corresponding to the state of deformation beyond the measuring limit, but within the elastic limit of the deformable portion of a pressure-sensitive element. When an overpressure acts on the pressure-sensitive element, the deformable portion of the pressure-sensitive element is brought into full contact with the curved surface portion of the restricting member before the deformable portion of the pressure-sensitive element is deformed beyond its elastic limit. Thus, the deformable portion is directly prevented from being displaced beyond its elastic limit.

8 Claims, 5 Drawing Figures

PRESSURE TRANSDUCER

BACKGROUND OF THE INVENTION

1. Field of the Invention

This invention relates to a pressure transducer including a semiconductor pressure-sensitive element, and in particular, a pressure transducer including a pressure-sensitive element based on the piezoresistive effect.

2. Description of the Prior Art

A differential pressure sensing device 10, as shown in FIG. 1, is well known as a pressure measuring device having a semiconductor pressure-sensitive element. The differential pressure sensing device 10 includes a body case 14 in which a pressure transducer 12 having a semiconductor pressure-sensitive element is housed. The semiconductor pressure-sensitive element measures the value of pressure applied by utilizing the piezoresistive effect of a resistance layer which is formed by diffusing an impurity into the opposite surfaces of a semiconductor substrate made of, for example, silicon. In order to apply different pressures between both the surfaces of the pressure-sensitive element, first and second flow passages 16a and 16b are provided in the body case 14. The first flow passage 16a is opened at one end to a first surface side of the pressure-sensitive element and blocked at the other end by a first isolation diaphragm 18a. The second flow passage 16b is opened at one end to a second surface side of the pressure-sensitive element and blocked at the other end by a second isolation diaphragm 18b. Pressure transmitting media 20a and 20b are sealed in the corresponding first and second flow passages 16a and 16b. The values of pressure Pa, Pb (Pa>Pb) to be measured with respect to the diaphragms 18a, 18b are transmitted to the corresponding surface sides of the pressure-sensitive elements. In this way, a stress corresponding to a difference (Pa−Pb) between the values of pressure Pa and Pb acts on the pressure-sensitive element 12. The stress corresponding to the above-mentioned pressure difference is produced in the pressure-sensitive element and the corresponding stress is also produced in the resistive layer of the pressure-sensitive element. The resistive layer has its resistive value varied, by the piezoresistive effect, according to the stress applied thereto. The pressure difference acting on the pressure transducer 12 can be measured by measuring the resistive value of the resistive layer.

The pressure-sensitive element, if applied with a value of pressure exceeding its elastic limit, will be fractured. Now suppose that the values of pressure Pa and Pb to be measured are, for example, 140 kg/cm² and 141 kg/cm², respectively. In this case, the pressure difference will be 1 kg/cm² which is within the measuring range. However, there is a possibility that the first value of pressure Pa only will be produced due to a failure of a valve which is attached to an external introduction line for processing fluid, etc. In this case, a pressure value of 140 kg/cm² acts directly on one surface side of the pressure-sensitive element, causing the pressure-sensitive element to be destroyed. In order to prevent the element from being destroyed by an excessive value of pressure, an excessive pressure preventing mechanism 22 is disposed within the body case 14. The mechanism 22 includes a bellows 24 for separating the first and second pressure transmitting media 20a and 20b from each other and a valve stem 26 extending through the bellows 24, and fixed in place. The valve stem 26 has its opposite ends located in the first and second flow passages 16a and 16b, respectively, and includes first and second valve bodies 28a and 28b. The area between the first valve 28a and the pressure-sensitive element in the first flow passage 16a is restricted by a first projection 30a provided on the body case 14, while the area between the first valve 28b and the pressure-sensitive element in the second flow passage 16b is restricted by a second projection 30b provided on the body case 14. First and second O-rings 32a and 32b are provided on the valve bodies 28a and 28b, respectively, so as to block the first and second flow passages 16a and 16b. In this way, the excessive pressure preventing mechanism 22 prevents the direct action of the excessive value of pressure on the pressure-sensitive element. Now assume that, for example, the second value of pressure Pb to be measured is an excessive pressure. In this case, the second isolation diaphragm 18b is pushed to the left in FIG. 1 and thus the bellows 24, first and second valve bodies 28a and 28b and valve stem 26 are moved by the second pressure transmitting medium 20b, as one unit to the left in FIG. 1, causing the second O-ring 32b to firmly abut against the second projection 30b. Movement of the second pressure transmitting medium 20b for transmitting the second value of pressure Pb to be measured is prevented, and thus the excessive pressure is prevented from being transmitted to the pressure-sensitive element. In this way, the excessive pressure preventing mechanism 22 causes only the pressure value not exceeding the elastic limit of the pressure-sensitive element to act on the pressure-sensitive element, permitting it to be completely protected against excessive pressure. However, the provision of the mechanism 22 in the body case 14 requires a bulkier device as well as an increased amount of pressure transmitting medium (20a, 20b). The mechanism 22, however, serves as an indirect means for preventing the application of excessive pressure to the pressure-sensitive element by blocking the movement of the pressure transmitting medium. A growing demand has been made for a direct means from the standpoint of reliability as well as safety.

SUMMARY OF THE INVENTION

It is accordingly the object of this invention to provide a pressure transducer which can protect a pressure-sensitive element from excessive pressure without any complicated arrangement.

According to this invention, a pressure transducer is provided, which comprises a body having a recess on one side which is defined by a curved surface portion; and a semiconductor pressure-sensitive element mounted on one side of the body and adapted to show a resistive value when a pressure value acts thereon, said semiconductor pressure-sensitive element including a deformable portion adapted to be displaced in the recess due to the pressure value to produce internal stress, and a plurality of resistive layers which show resistive values corresponding to the internal stress, the curved surface portion being brought into face contact with the deformable portion to prevent further deformation of the deformable portion when the deformable portion is displaced due to a pressure level greater than a pressure value within a measuring range, but smaller than a pressure level corresponding to an elastic limit of the deformable portion.

The pressure transducer of this invention includes a restricting member having a curved surface portion, in which when an excessive value of pressure acts on the pressure-sensitive element, the deformable portion of the pressure-sensitive element is brought into full contact with the curved surface portion of the restricting member before the deformable portion of the restricting member is deformed beyond its elastic limit, thereby directly preventing the deformable portion from being displaced beyond its elastic limit. The mere provision of the curved surface portion prevents the pressure-sensitive element from being destroyed even if an excessive value of pressure acts on the pressure-sensitive element. It is therefore possible to provide a highly reliable pressure transducer.

The following advantages can be obtained according to this invention.

(1) Since the device of this invention obviates the necessity of providing the above-mentioned conventional excessive pressure preventing mechanism which requires more space, it can be made compact and light weight.

(2) An amount of pressure transmitting medium for transmitting a value of pressure to be measured can be greatly decreased, permitting a reduction in cost.

(3) The device of this invention can obtain an excellent result with less temperature dependence, because it is possible to decrease the amount of pressure transmitting medium which is easily influenced by temperature variations.

(4) There is no response problem, which may arise when an abrupt variation in pressure occurs as in the conventional excessive pressure means. There is no danger, even when an excessive value of pressure is applied due to the compression of an O-ring. Furthermore, neither strict choice of materials nor fine adjustment is required in each associated part of the conventional excessive pressure preventing mechanism.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein.

DETAILED DESCRIPTION OF THE PREFERRED EMBODIMENTS

A pressure transducer according to a first embodiment of this invention will be explained below as applied to a pressure measuring device, not to a differential pressure converter of FIG. 1, by referring to FIGS. 2 and 3 jointly.

Figure 1:
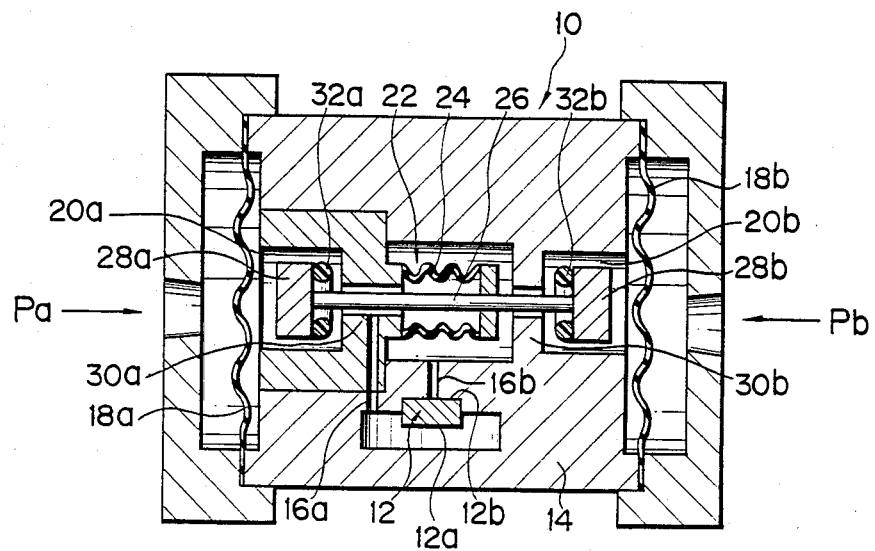
FIG. 1 is a cross-sectional view showing a conventional pressure transducer equipped with an excessive pressure preventing mechanism.

In the pressure transducer 34 according to the first embodiment of this invention, one input pressure of the differential pressure converter is defined as a reference value of pressure, i.e., the pressure level $Pb$ of FIG. 1 is defined as a reference level of pressure. The pressure transducer 34 includes a flat plate-like base 36. A pressure conducting hole 38 extends through the central area of the base 36 in the thickness direction. The pressure transducer 34 corresponds to the device 12 in the differential pressure converter of FIG. 1 and the flow passage 16b corresponds to the pressure conducting hole 38. A semiconductor pressure-sensitive element 40 for measuring a value of pressure which acts in one direction, i.e. from above in the first embodiment of FIG. 2 is disposed on the base 36.

The pressure-sensitive element 40 is formed of, for example, a silicon crystal substrate and has a cylindrical recess 42 in the lower central area thereof. In other words, the element 40 has a doughnut-like thick-walled leg 44 and a thin-walled deformable portion 46 which blocks the upper opening of the leg portion 44. The deformable portion 46 of the element 40 is formed such that the internal stress varies according the pressure acting thereon. A pair of resistive layers 48, 48 are formed by diffusion in the predetermined surface areas of the deformable portion 46. The resistive layer 48 has such a piezoresistive effect that the resistive value varies according to the internal stress acting thereon. Electrode layers 50, 50 are attached to the respective ends of the resistive layers, and lead wires 52, 52 are connected to the corresponding electrode layers 50, 50. Such a connecting relation permits a variation in the resistance of the resistive layer 48 to be led out through the lead wire 52.

The pressure-sensitive element 40 so constructed is fixed to the base 36 by bonding the bottom surface of the leg portion 44 by an adhesive 54 to the top surface of the base 36. On the base 36 a restricting member 56 is fitted in the recess 42 to restrict the deformation of the deformable portion 46 of the pressure-sensitive element 40 to within its elastic limit.

The restricting member 56 is a substantially flattened circular member having an outer diameter substantially the same as the inner diameter of the recess 42. That is, the outer peripheral surface of the restricting member 56 firmly contacts that inner surface of the pressure-sensitive element 40 which defines the side surface of the recess 42. The restricting member 56 has an inwardly curved surface portion 58 which faces the deformable portion 46 of the element 40. The outer edge of the curved surface portion 58 of the restricting member 56 is located flush with the top inner surface of the recess 42. That is, the outer edge of the deformable portion 46 is supported by the outer edge of the restricting member 56. In the state in which no excessive pressure acts on the deformable portion 46 of the pressure-sensitive element 40, the deformable portion 46 of the pressure-sensitive element 40 is not supported except for the outer edge thereof. That is, a space 59 for permitting the deformation of the deformable portion 46 is defined between the lower surface of the deformable portion 41 of the element 40 and the curved surface portion 58 of the restricting member 56.

The shape of the curved surface portion 58 of the element 56 is so defined that, when the deformable portion 46 is deformed due to excessive pressure, it can be deformed into the shape corresponding to a stressed state of the measuring limit. The shape of the curved surface portion 58 is not restricted to the above-mentioned shape. Where the curved surface portion 58 is so defined as to have a shape corresponding to the state of deformation beyond the measuring limit, but within the elastic limit of the deformable portion 46, a desired object can be attained even if the measuring limit is exceeded.

The restricting member 56 may be placed merely on the base 36 or bonded by an adhesive to the base 36. It is needless to say that the bonding of the restricting member 56 to the base 36 is preferable from the standpoint of safety. For ease of machining, the restricting member 56 is preferably made of a metal, such as mild steel, brass or aluminium.

The pressure-sensitive element 40 is bonded by, for example, a molten glass to the base 36. It is necessary to use, for the restricting member 56, a material having a higher melting temperature than the bonding temperature. In the restricting member 56, with the restricting member 56 fitted in the recess 42, a second pressure conducting hole 60 is formed which communicates with the pressure conducting hole 38 of the base 36.

The measuring operation of the pressure transducer 34 so constructed will be explained below.

Figure 2:
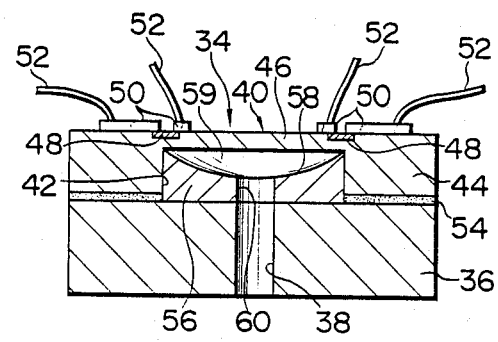
FIG. 2 is a cross-sectional view showing a pressure/electricity converting device according to a first embodiment of this invention.
Figure 3:
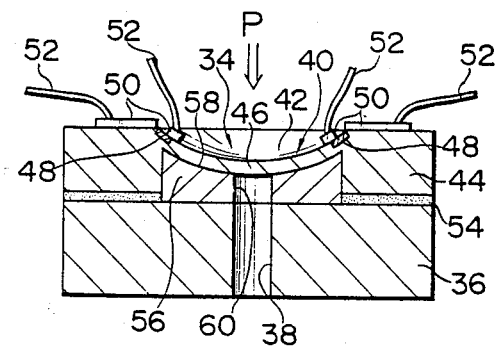
FIG. 3 is a cross-sectional view showing the state in which an excessive value of pressure acts on the device of FIG. 2.

If a pressure value P to be measured is applied from above as shown in FIG. 2, the deformable portion 46 of the pressure-sensitive element 40 suffers an internal stress according to the pressure value P. The resistive value of the resistive element 40 becomes a predetermined value according to the internal stress. The pressure value P, after being converted to an internal stress in the deformable portion 46 of the pressures-sensitive element 40, is externally led out, as an electric signal, through the electrode 50A and lead wire 52. Thus, the applied pressure value is electrically detected.

Where the pressure value is so excessive as to deform the deformable portion 46 beyond its elastic limit, the deformation of the deformable portion 46 is directly restricted according to this invention, without stopping the transmission of the pressure value as in the conventional excessive pressure preventing mechanism.

Where any excessive value of pressure is inadvertently applied to the pressure-sensitive element 40, the deformable portion 46 is pushed downward, as shown in FIG. 3. The deformable portion 46, before being deformed beyond its elastic limit, abuts against the curved surface portion 58 of the restricting member 56, forceably preventing the deformable portion 46 from being deformed beyond the measuring range. Even if the applied pressure value becomes excessive beyond the measuring range, there is no possibility that the deformable portion 46 will be deformed beyond its elastic limit and destroyed.

It is to be noted that, even if the excessive value of pressure continues to be applied in such a state that the member 40 is brought into contact with the restricting member 56 and prevented from being further displaced, there is no risk that the member 40 will be destroyed.

This invention is not restricted to the above-identified first embodiment and may be modified without departing from the spirit and scope of this invention.

Figure 4:
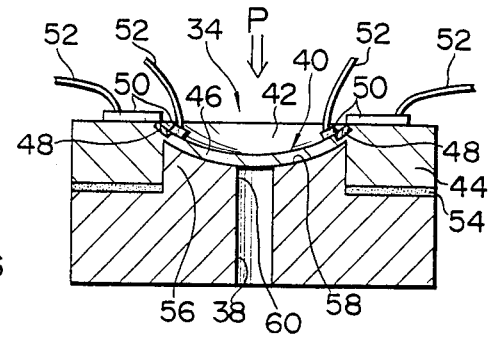
FIG. 4 is a cross-sectional view showing a pressure transducer according to a second embodiment of this invention.

In the above-mentioned first embodiment, the restricting member 56 is provided separate from the base 36, but this invention is not restricted thereto. In a second embodiment as shown in FIG. 4, for example, a restricting member 56 may be provided so as to be integral with the base 36. In this embodiment, the curved surface portion 58 is formed by an ultrasonic machining technique. The second embodiment can obviate the necessity of bonding the restricting member 56 by the adhesive to the base 36.

Although, in the first embodiment, the restricting member 56 having the initially prepared curved surface portion 58 has been explained as being fitted in the recess 42, this invention is not restricted thereto. The curved surface portion 58 may be made as follows.

That is, after a pressure-sensitive element 40 is adhesively bonded to the base 36, a liquid thermosetting resin, such as epoxy resin, is filled from a pressure conducting hole 38 of the base 36 into a recess 42. The filled epoxy resin is heated and cured. Before the resin is completely cured, an excessive value of pressure which causes a deformable portion 46 to be displaced within the elastic limit is applied to the pressure-sensitive element 40, causing the deformable portion 46 to be deformed. With this state maintained, the epoxy resin is completely cured. After the resin is cured, the application of excessive pressure is released, causing the deformable portion to be returned to the original position. In this way, the restricting member 56 having a predetermined curved surface portion 58 is formed by the epoxy resin in the recess 42.

In this case, it is necessary to use, as the material of the restricting member 56, an epoxy resin whose curing temperature is lower than the melting temperature of an adhesive 50 whereby the pressure-sensitive element 40 is bonded to the base 36. That is, if the curing temperature of the resin material is higher than the melting temperature of the adhesive 54, the adhesive 54 is molten during the curing of the resin material. For this reason, there is a risk that the pressure-sensitive element 40 will be separated from the base 36. In this embodiment, the melting temperature of low melting glass or eutectic alloy which is used as the adhesive 54 is normally of the order of 300°~500° C., while the curing temperature of the epoxy resin is of the order of 100° C. Thus, there is no risk that the adhesive 54, such as the low melting glass, will be molten during the curing of the resin material. The pressure-sensitive element 40 can be bonded to the base 36 by electrostatic attraction which permits a bond to be effected at a temperature greater than a predetermined temperature.

A mold release agent such as tetrafluoroethylene is initially coated on that surface of the deformable portion 46 which is provided on the side of the base 36, thus preventing the epoxy resin from being attached to the deformable portion 46. In order to form a second pressure conducting hole 60 at the central portion of the restricting member 56, a pipe formed of tetrafluoroethylene resin is inserted through the pressure conducting hole 38 into the epoxy resin after the injecting of the epoxy resin, but before the curing of the epoxy resin. The pipe is withdrawn from the epoxy resin after the resin is cured.

In this way, the restricting member 56 is formed in such a state that the deformable portion 46 is displaced due to the excessive value of pressure not destroying the deformable portion 46. Even if an excessive value of pressure which may destroy the deformable portion 46 is applied to the deformable portion 46, the deformable portion 46 is prevented from being displaced beyond a predetermined limit, and not destroyed, thus realizing the highly reliable restricting member 56.

Figure 5:
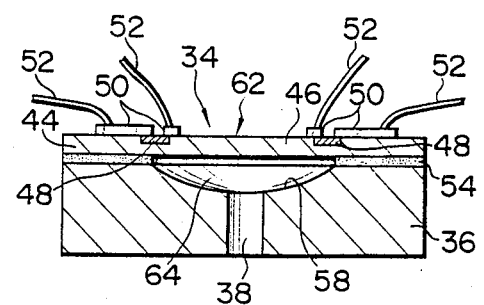
FIG. 5 is a cross-sectional view showing a pressure transducer according to a third embodiment of this invention.

Although in the first embodiment the recess 42 is provided in the pressure-sensitive element 40, this invention is not restricted thereto. It is only necessary to provide a curved surface portion at a position adjacent to the deformable portion 46 of the pressure-sensitive element 40 so that, when a value of pressure exceeding the measuring range acts on the deformable portion, the curved surface portion can support the deformable portion 46, while permitting the deformable portion 46 to be deformed within the measuring range. The curved surface portion may be formed, for example, as a third embodiment shown in FIG. 5. That is, a pressure-sensitive element 62 is formed of a thin disc having a uniform thickness with its central area defined as the deformable portion 46 and its outer edge portion supported as a leg portion 44. A recess 64 is formed on that area of a base 36 which confronts the deformable portion 46, and is defined by a curved surface portion 58 which corresponds to the above-mentioned recess 59. A pressure conducting hole 38 communicates with the recess 64. In the third embodiment, it is possible to obtain the same result as in the first embodiment.

Although, in the above-mentioned embodiments, explanation has been given of the pressure transducer on which a pressure value to be measured acts from one direction, it is needless to say that this invention can equally be applied to a pressure transducer on which pressure values act from the opposite two directions, as shown in FIG. 1.

What is claimed is:

1. A pressure transducer, comprising:

a body having a recess on one side which is defined by a curved surface portion; and a semiconductor pressure-sensitive element mounted on one side of the body and adapted to show a resistive value when a pressure applies thereon, said semiconductor pressure-sensitive element including a deformable portion adapted to be displaced in the recess due to the pressure value to produce internal stress, and a plurality of resistive layers which show resistive values corresponding to the internal stress, the curved surface portion being brought into face contact with the deformable portion to prevent further deformation of the deformable portion when the deformable portion is displaced due to a pressure value greater than a pressure value within a measuring range, but smaller than a pressure value corresponding to an elastic limit of the deformable portion wherein said semiconductor pressure-sensitive element includes a cylindrical depression which is opened on said one side of said body; and wherein said body includes a disc-like base on which said semiconductor pressure-sensitive element is mounted, and a restricting member placed on the base, fitted in the cylindrical depression and having said recess defined by said curved surface portion.

2. The pressure transducer according to claim 1, in which said restricting member is provided separate from said base.

3. The pressure transducer according to claim 1, in which said restricting member is provided integral with said base.

4. The pressure transducer according to claim 1, in which said semiconductor pressure-sensitive element is bonded to the base at a temperature exceeding a predetermined temperature.

5. The pressure transducer according to claim 4, in which said restricting member is made of a material having a melting temperature higher than said predetermined temperature.

6. The pressure transducer according to claim 5, in which said material includes a thermosetting resin.

7. The pressure transducer according to claim 1, further including a bonding layer which is formed of an adhesive whereby said semiconductor pressure-sensitive element is bonded to said base.

8. The pressure transducer according to claim 1, in which said semiconductor pressure-sensitive element has a disc-like shape.

* * * * *